United States Patent [19]

Wetor

[11] Patent Number: 4,955,249
[45] Date of Patent: Sep. 11, 1990

[54] CONTROL MECHANISM FOR HYDROSTATIC TRANSMISSION

[75] Inventor: Clyde R. Wetor, Cascade, Wis.

[73] Assignee: Outboard Marine Corporation, Waukegan, Ill.

[21] Appl. No.: 371,268

[22] Filed: Jun. 26, 1989

[51] Int. Cl.$^5$ ............................ G05G 9/12; G05G 5/04
[52] U.S. Cl. ...................................... 74/473 R; 74/96; 74/474; 74/526; 267/150
[58] Field of Search ............... 74/96, 473 R, 474, 491, 74/526; 200/6 A, 557; 267/150

[56] References Cited

U.S. PATENT DOCUMENTS

| | | | |
|---|---|---|---|
| 2,195,084 | 3/1940 | Eklund | 187/29 |
| 2,427,621 | 9/1947 | Peterson | 64/27 |
| 2,674,423 | 4/1954 | Noxon | 267/150 X |
| 2,674,448 | 4/1954 | Marple | 267/1 |
| 2,756,610 | 7/1956 | Hibbard | 267/150 X |
| 3,276,285 | 10/1966 | Irgens | 74/470 |
| 3,628,393 | 12/1971 | Houk | 74/470 |
| 4,093,953 | 6/1978 | Hammons et al. | 74/526 X |
| 4,111,062 | 9/1978 | Callaghan | 74/96 |
| 4,352,302 | 10/1982 | McAuliffe et al. | 74/474 |
| 4,375,771 | 3/1983 | Kobelt | 74/470 |
| 4,458,549 | 9/1984 | Tani et al. | 74/473 R |
| 4,489,304 | 12/1984 | Hayes | 74/471 XY X |
| 4,490,710 | 12/1984 | Kopsho, Jr. et al. | 338/128 |
| 4,569,244 | 2/1986 | Akerstrom | 200/557 X |

Primary Examiner—Allan D. Herrmann
Attorney, Agent, or Firm—Michael, Best & Friedrich

[57] ABSTRACT

Disclosed herein is a control for a hydrostatic transmission having an operating member rotatable about a fixed pivot axis between a range of forward drive positions, a neutral position, and a range of reverse drive positions, which control comprises an actuating member adapted to be fixed to the operating member for common movement therewith about the pivot axis and having a portion adapted to be connected to an actuating link to effect pivotal movement of the actuating member about the pivot axis, first and second return members mounted on the actuating member in facing relation to each other and for independent pivotal movement about the pivot axis, a pin fixed on the actuating member and extending between the first and second return members, a spring urging the return members toward each other and into engagement with the pin, a neutral adjustment member, and structure located in fixed relation to the pivot axis for locating the neutral adjustment member between the first and second return members and for adjustably moving the neutral adjustment member along a fixed path.

17 Claims, 1 Drawing Sheet

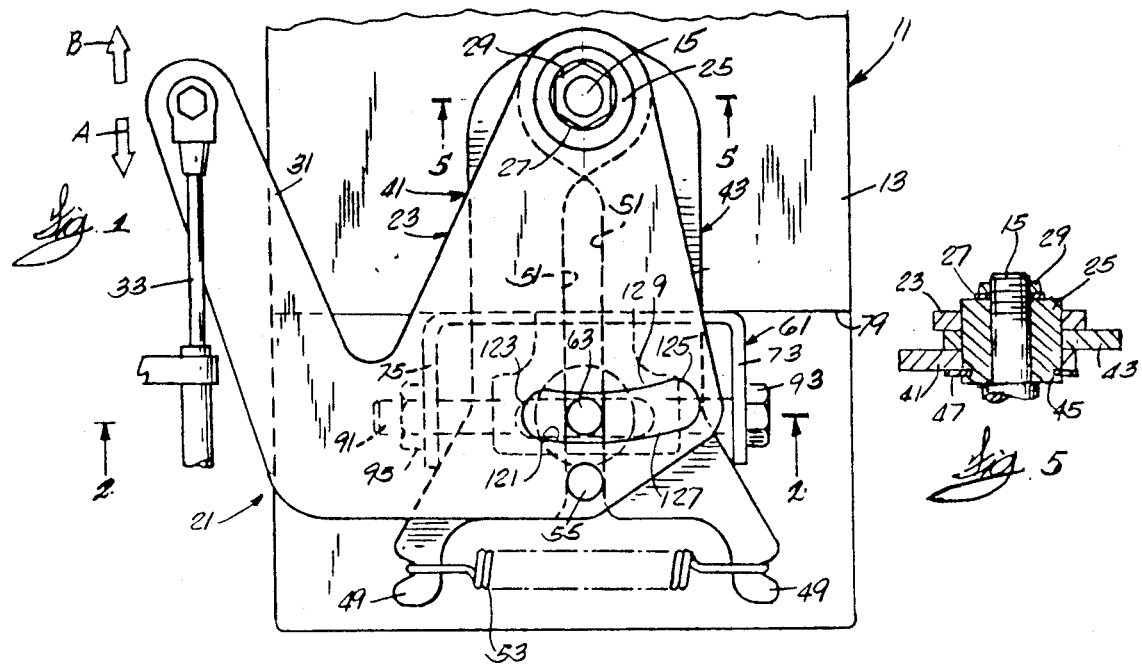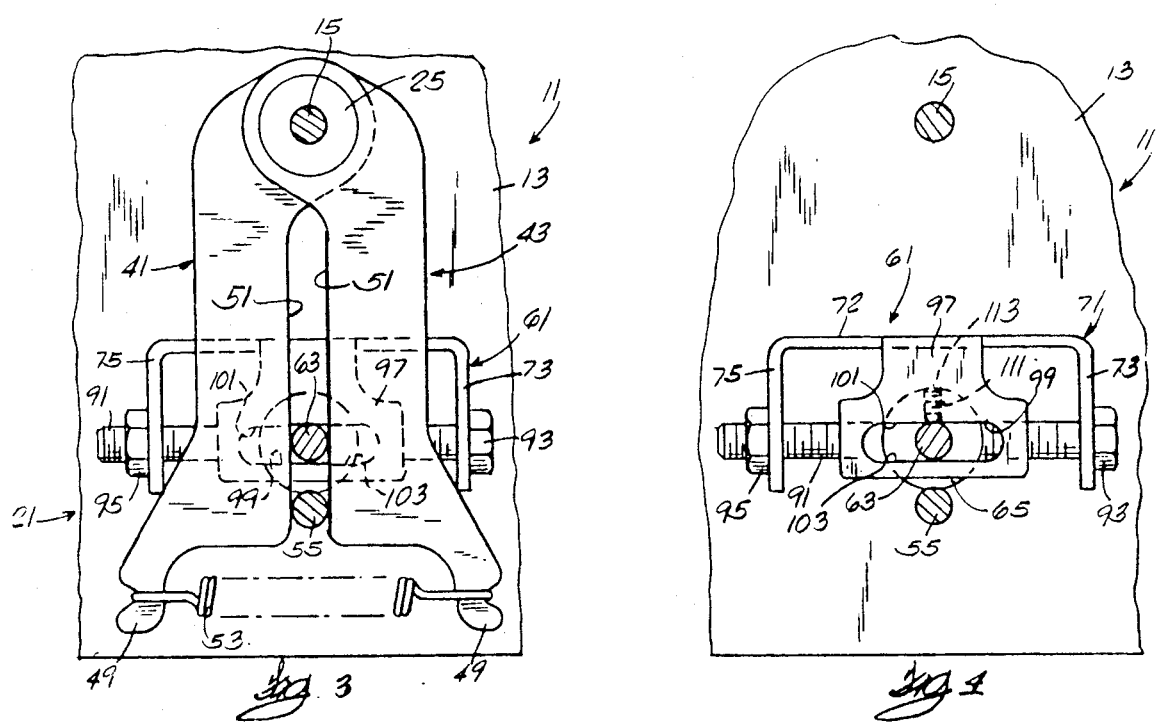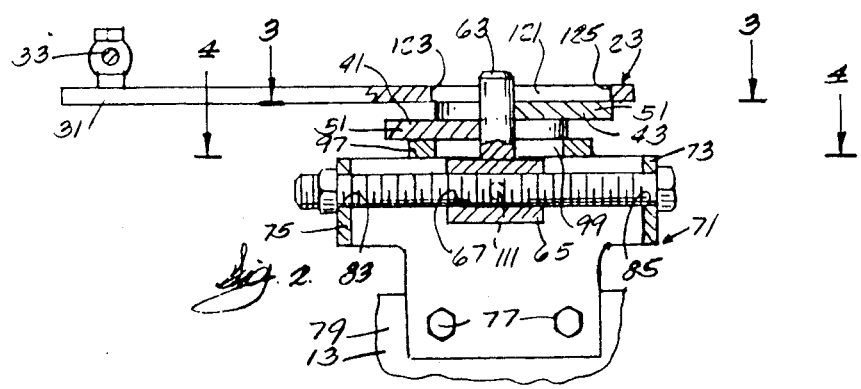

CONTROL MECHANISM FOR HYDROSTATIC TRANSMISSION

BACKGROUND OF THE INVENTION

1. Field of the Invention

The invention relates generally to fluid or hydrostatic transmissions and, more particularly, to operating controls therefor.

2. Reference to Prior Art

In prior hydrostatic transmissions, the precise angular location of the neutral position of the operating shaft sometimes varies from one transmission to another because of tolerances in manufacture. Furthermore, prior controls were not readily adjustable to afford coordination of the neutral position of the control with the location of the neutral position of the hydrostatic transmission. Thus, the neutral position of the control was sometimes offset from the neutral position of the operating shaft of the hydrostatic transmission.

Attention is directed to the following U.S. Pat. Nos.:
2,195,084 H. N. Eklund; Mar 26, 1940
2,427,621 E. S. Peterson; Sept. 16, 1947
2,674,448 R. Marple; Apr. 6, 1954
3,276,285 F. T. Irgens; Oct. 4, 1966
3,628,393 R. D. Houk; Dec. 21, 1971
4,111,062 W. I. Callaghan; Sept. 5, 1978
4,375,771 J. Kobett; Mar. 8, 1983
4,458,549 A. Tani, et al.; July 10, 1984
4,490,710 Kopsho, Jr., et al.; Dec. 25, 1984

SUMMARY OF THE INVENTION

The invention provides a control for a hydrostatic transmission having an operating member rotatable about a fixed pivot axis between a range of forward drive positions, a neutral position, and a range of reverse drive positions, which control comprises an actuating member adapted to be fixed to the operating member for common movement therewith about the pivot axis and having a portion adapted to be connected to an actuating link to effect pivotal movement of the actuating member about the pivot axis, a first return member mounted for pivotal movement about the pivot axis and independently of pivotal movement of the actuating member, a second return member mounted for pivotal movement about the pivot axis and independently of pivotal movement of the actuating member and of the first return member and located in facing relation to the first return member, a pin fixed on the actuating member and extending between the first and second return members, means engaging the return members for biasing the return members toward each other and into engagement with the pin, a neutral adjustment member, and means located in fixed relation to the pivot axis for locating the neutral adjustment member between the first and second return members and for adjustably moving the neutral adjustment member along a fixed path.

In one embodiment of the invention, the means for adjustably moving the neutral adjustment member comprises an element threadedly engaged with the neutral adjustment member, and means for rotatably supporting the element for rotation about an axis coincident with the path, and means for preventing rotation of the adjustment member in common with rotation of the element, whereby rotation of the element causes movement of the neutral adjustment member along the path.

In one embodiment of the invention, the means for rotatably supporting the element comprises a bracket fixed with respect to the pivot axis.

In one embodiment of the invention, the bracket includes two spaced bracket portions which extend in parallel relation to each other and which include therein respective apertures, and the element extends in the apertures.

In one embodiment of the invention, the element is a cap screw including a head located exteriorly of one of the bracket portions and further including a lock nut threadedly engaged on the cap screw exteriorly of the other of the bracket portions and tightened against the other bracket portion to restrict axial movement of the cap screw relative to the bracket.

In one embodiment of the invention, the control further includes means for restraining rotation of said neutral adjustment member.

In one embodiment of the invention, the means for restraining rotation of said neutral adjustment member comprises a portion on the bracket and having therein an elongated slot which receives the neutral adjustment member for travel therein, and which includes elongated edges engageable by the neutral adjustment member to prevent rotation of the neutral adjustment member in common with rotation of the element.

In one embodiment of the invention, the control further includes means for restraining movement of the neutral adjustment member along the path relative to the element.

In one embodiment of the invention, the means for restraining movement of the neutral adjustment member comprises a nylon set screw extending in the neutral adjustment member and frictionally engaging the element.

In one embodiment of the invention, the means for restraining movement of the neutral adjustment member comprises means for restraining rotation of the element relative to the bracket.

In one embodiment of the invention, the control further includes means for limiting pivotal movement of the actuating member about the pivot axis.

In one embodiment of the invention, the means for limiting pivotal movement of the actuating member comprises an arcuate slot which extends in the actuating member, and which has opposite ends engageable with the neutral adjustment member to limit pivotal movement of the actuating member.

The invention also provides a control for a hydrostatic transmission having an operating member rotatable about a fixed pivot axis between a range of forward drive positions, a neutral position, and a range of reverse drive positions, which control comprises an actuating member adapted to be fixed to the operating member for common movement therewith about the pivot axis and having a portion adapted to be connected to an actuating link to effect pivotal movement of the actuating member about the pivot axis, a first return member mounted on the actuating member for pivotal movement about the pivot axis and independently of pivotal movement of the actuating member and including a part spaced from the pivot axis, a second return member mounted on the actuating member for pivotal movement about the pivot axis and independently of pivotal movement of the actuating member and of the first return member and including a part spaced from the pivot axis and located in facing relation to the part of the first return member, a pin fixed on the actuating member and extending between the parts of the first and second return members, means engaging the return members for biasing the return members toward each other and into engagement with the pin, a neutral adjustment member including a pin portion extending between the parts of the first and second return members and a hub portion including a threaded bore, an element threadedly engaged with the bore of the neutral adjustment member, a bracket including two spaced bracket portions which extend in parallel relation to each other and which respectively include therein apertures receiving the element for rotation about another fixed axis extending at a right angle from a radius from the pivot axis, and a third bracket portion having therein an elongated slot which receives the pin portion of the neutral adjustment member for travel therein, and which includes elongated edges engageable by the pin portion of the neutral adjustment member to prevent rotation of the neutral adjustment member, whereby rotation of the element causes movement of the neutral adjustment member along the axis of the element.

Other features and advantages of the invention will become apparent to those skilled in the art upon review of the following detailed description, claims, and drawings.

THE DRAWINGS

FIG. 1 is plan view of a control mechanism for a hydrostatic transmission, which mechanism includes various of the features of the invention.

FIG. 2 is a fragmentary view, partially in section, taken along line 2—2 of FIG. 1.

FIG. 3 is a fragmentary view, partially in section, taken along line 3—3 of FIG. 2.

FIG. 4 is a fragmentary view, partially in section, taken along line 4—4 of FIG. 2.

FIG. 5 is a fragmentary sectional view taken along line 5—5 of FIG. 1.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Shown schematically in the drawings is a fluid or hydrostatic transmission 11 which is contained within a housing 13 and which includes an operating shaft 15 which extends through the housing 13 and which is pivotable between a range of forward speed positions, a neutral position, and a range of reverse speed positions. The fluid or hydrostatic transmission 11 can be of any suitable construction and will not be further described herein.

Operatively connected to the fluid transmission 11 is a control 21 which operates to pivot the operating shaft 15 between its various positions and which includes an arrangement for facilitating adjustment of the control 15 to match the specific neutral drive position of the operating shaft 15 of the hydrostatic transmission 11.

More particularly, the control 21 comprises an actuating member or plate 23 having a hub 25 which is received by and fixed for common rotation with the operating shaft 15 of the hydrostatic transmission 11 by any suitable means. A lock washer 27 and nut 29 threaded on the outer end of the operating shaft 15 retains the actuating member or plate 23 in fixed relation on the operating shaft 15 of the hydrostatic transmission 11. Other arrangements can also be employed for retaining the actuating member or plate 23 on the operating shaft 15.

The actuating member or plate 23 also includes a portion 31 spaced from the hub 25 and connected to a actuating link or cable 33 which is controlled by a user or operator and which is employed to shift the actuating member 23 between its operating positions.

Also forming part of the control 21 are first and second or left and right return members 41 and 43, respectively, which are of generally identical construction except for being left and right handed. The return members 41 and 43 are both pivotally carried by the hub 25 for rotation about the axis of the operating shaft 15 and relative to each other and relative to the actuating member or plate 23.

Any suitable means can be employed to retain the return members 41 and 43 on the hub 25. In the illustrated construction, such means compromises an annular groove 45 in the hub 25 and a C-shaped retainer ring 47 received in the groove 45 to prevent axially outward movement of the return members 41 and 43 off the hub 25.

While the return members 41 and 43 can take various forms, in the illustrated construction, each of the return members 41 and 43 includes an outer hook shaped end 49 and a part 51 located intermediate the outer end 49 and the hub 25. Such parts 51 have relatively straight edges and are located, when the fluid transmission 11 is in the neutral position, in spaced and facing parallel relation to each other.

The control 21 also includes a pin or stud 55 which is fixed to the actuating member or plate 23 in spaced relation from the hub 25 and which extends into the space between the spaced parts 51 of the return members 41 and 43.

In addition, the control 21 includes a coil spring 53 which interconnects the hook shaped outer ends 49 of the return members 41 and 43 and biases the return members 41 and 43 into engagement with the pin 55 on the actuating plate or member 23.

Still further in addition, the control 21 includes a neutral adjustment member 61 and means located in fixed relation to the transmission housing 13 for locating the neutral adjustment member 61 between the return member parts 51 and for adjustable movement along a path extending in a plane perpendicular to the axis of the operating shaft 15 and at a right angle to a radius extending from the axis of the operating shaft 15.

While other constructions can be employed, in the disclosed construction, the neutral adjustment member 61 includes, in part, a pin portion 63 which is of about the same diameter or size as the pin 55 on the actuating member or plate 23 and which extends between the parts 51 of the return members 41 and 43 in slightly spaced and parallel relation to the pin 55 extending from the actuating member or plate 23.

The neutral adjustment member 61 also includes an enlarged hub or portion 65 which extends rigidly from the pin portion 63 and which includes a threaded cross bore 67 extending diametrically with respect to the axis of the pin portion 63.

While other constructions can be employed, the means for locating the neutral adjustment member 61 between the return member parts 51 and for adjustable movement along the path in a plane perpendicular to the axis of the operating shaft 15 and at a right angle to a radius extending from the axis of the operating shaft 15 comprises an elongated bracket 71 which is suitably fixed (See FIG. 2) by bolts 77 to a surface 79 of the transmission housing 13, and which includes a central web 72 and two spaced and opposed end bracket portions 73 and 75 which respectively include coaxially aligned respective apertures 83 and 85. Extending through the apertures 83 and 85 and in threaded engagement through the threaded cross bore 67 in the neutral adjustment member 61 is an element 91 which can take various forms and which, in the disclosed construction, is a cap screw having, at one end thereof, a head 93 engaged against the outer surface of the bracket end portion 73 and having, at the other end thereof, a threadedly engaged lock nut 95 extending against the outer surface of the other bracket end portion 75.

The means for adjustably moving the neutral adjustment member 61 also includes means for preventing rotation of the neutral adjustment member 61 in common with rotation of the element or cap screw 91. While other arrangements can be provided, in the illustrated construction, such means comprises a third bracket portion 97 extending upwardly from the bracket web 72 and intermediate the bracket end portions 73 and 75 and including a slot 99 which receives the pin portion 63 of the neutral adjustment member 61 and which is defined by two spaced edges 101 and 103 extending parallel to the path of neutral adjustment member movement, thereby preventing rotation of the neutral adjustment member 61 about the axis of the element or cap screw 91.

Means are also provided for preventing unwanted rotation between the cap screw 91 and the neutral adjustment member 61. While other constructions can be employed, in the disclosed construction, such means compromises a nylon set screw 111 threaded into an aperture 113 in the enlarged portion 65 of the neutral adjustment member 61 and frictionally engaged with the element or cap screw 91. In addition, such means includes the lock nut 95 which is threaded onto the outer end of the element or cap screw 91 and which is tightened against the outer surface of the bracket end portion 75 to restrain axial movement of the cap screw 91.

The control 21 also includes a means for limiting operating movement of the actuating plate or member 23 relative to the neutral adjustment member 61 to establish the high forward speed position and the high reverse speed position of the control 21.

While other constructions can be employed in the disclosed construction, such means comprises, in the actuating member or plate 23, an arcuately extending slot 121 which extends at a constant radius from the hub 25, which receives the pin portion 63 of the neutral adjustment member 61 and which has opposite ends 123 and 125 engageable with the pin portion 63 of the neutral adjustment member 61.

The slot 121 also includes elongated sides 127 and 129 which, if desired, can cooperate with the pin portion 63 of the neutral adjustment member 61 to prevent rotation of the neutral adjustment member 61 in common with the element or cap screw 91. If such construction is employed, the third bracket portion 97 could be omitted. However, it is preferred to employ the slot 99 in the third bracket portion 97 to prevent rotation of the neutral adjustment member 61 about the axis of the element or cap screw 91, regardless of the slot 121 in the actuating member or plate 23.

In operation, movement of the actuating member 23 in the direction of the arrow A to a position spaced from the full line position in FIG. 1 causes the actuating plate 23 to rotate from the neutral position in the counterclockwise direction, thereby causing common movement of the operating shaft 15 of the hydrostatic transmission 11 into the reverse speed range and also causing movement of the right return member 43 in the counterclockwise direction in response to engagement of the pin 55 with the part 51 of the right return member 43. The other or left return member 41 is retained by the spring 53 against movement with the part 51 thereof engaged with the pin portion 63 of the neutral adjustment member 61. Such movement of the right return member 43 and the absence of any movement of the left return movement 41 causes extension of the spring 53. Upon release of the actuating link 33 from the position spaced from the full line position, the spring 53 will effect return movement of the right return member 43 to a position in engagement with the pin portion 63 of the neutral adjustment member 61, which return movement will, in effect, return the pin 55 and connected actuating member or plate 23 to the neutral position.

Displacement of the link in the opposite direction B to a location spaced from the full line illustration in FIG. 1 will result in exactly opposite operation of the control 21. Specifically, movement of the actuating link 23 in the direction of the arrow B to a position spaced from the full line illustration causes the actuating member or plate 23 to rotate from the neutral position in a clockwise direction, thereby causing movement of the hydrostatic transmission operating shaft 15 into the forward speed range and also causing movement of the left return member 41 in the clockwise direction in response to engagement of the pin 55 with the return member part 51.

The right return member 43 is restrained against movement by the spring 53 in a position of engagement of the part 51 thereon with the pin portion 63 of the neutral adjustment member 61. Such movement of the left return member 41 and the absence of any movement of the right return member 43 causes extension of the spring 53.

Upon release of the actuating link 33 from the position spaced from the full line position, the spring 53 will effect return movement of the left return member 41 which, in turn, will return the pin 55 and connected actuating member or plate 23 to the neutral location. The extent of the movement of the actuating member or plate 23 in the forward speed range and in the reverse speed range is limited by reason of engagement of the pin portion 63 of the neutral adjustment member 61 with the opposite ends 123 and 125 of the slot 121 in the actuating member or plate 23.

In order to locate the components of the control 21 in matching relation to the neutral condition of the hydrostatic transmission 11, the neutral adjustment member 61 can be displaced in the direction of the axis of the cap screw 91 by rotation of the cap screw 91 and by overcoming the frictional restraint imposed by the nylon set screw 111.

Various of the features of the invention are set forth in the following claims.

I claim:

1. A control for a hydrostatic transmission having an operating member rotatable about a fixed pivot axis between a range of forward drive positions, a neutral position, and a range of reverse drive positions, said control comprising an actuating member adapted to be fixed to the operating member for common movement therewith about the pivot axis and having a portion adapted to be connected to an actuating link to effect pivotal movement of said actuating member about the pivot axis, a first return member mounted for pivotal movement about the pivot axis and independently of pivotal movement of said actuating member, a second return member mounted for pivotal movement about the pivot axis and independently of pivotal movement of said actuating member and of said first return member and located in facing relation to said first return member, a pin fixed on said actuating member and extending between said first and second return members, means engaging said return members for biasing said return members toward each other and into engagement with said pin, a neutral adjustment member, and means located in fixed relation to the pivot axis for locating said neutral adjustment member between said first and second return members and for adjustably moving said neutral adjustment member along a fixed path.

2. A control in accordance with claim 1 and further including means for limiting pivotal movement of said actuating member about the pivot axis.

3. A control in accordance with claim 2 wherein said means for limiting pivotal movement of said actuating member comprises an arcuate slot which extends in said actuating member, which receives said neutral adjustment member, and which has opposite ends engageable with said neutral adjustment member to limit pivotal movement of said actuating member.

4. A control for a hydrostatic transmission having an operating member rotatable about a fixed pivot axis between a range of forward drive positions, a neutral position, and a range of reverse drive positions, said control comprising an actuating member adapted to be fixed to the operating member for common movement therewith about the pivot axis and having a portion adapted to be connected to an actuating link to effect pivotal movement of said actuating member about the pivot axis, a first return member mounted for pivotal movement about the pivot axis and independently of pivotal movement of said actuating member, a second return mounted for pivotal movement about the pivot axis and independently of pivotal movement of said actuating member and of said first return member and located in facing relation to said first return member, a pin fixed on said actuating member and extending between said first and second return members, means engaging said return members for biasing said return members toward each other and into engagement with said pin, a neutral adjustment member, and means located in fixed relation to the pivot axis for locating said neutral adjustment member between said first and second return members and for adjustably moving said neutral adjustment member along a fixed path and including an element threadedly engaged with said neutral adjustment member, and means for rotatably supporting said element for rotation about an axis coincident with said path, and means for preventing rotation of said adjustment member in common with rotation of said element, whereby rotation of said element causes movement of said neutral adjustment member along said path.

5. A control in accordance with claim 4 wherein said means for rotatably supporting said element comprises a bracket fixed with respect to the pivot axis.

6. A control in accordance with claim 5 wherein said bracket includes two spaced bracket portions which extend in parallel relation to each other and which include therein respective apertures, and wherein said element extends in said apertures.

7. A control in accordance with claim 6 wherein said element is a cap screw including a head located exteriorly of one of said bracket portions and further including a lock nut threadedly engaged on said cap screw exteriorly of the other of said bracket portions and tightened against said other bracket portion to restrict axial movement of said cap screw relative to said bracket.

8. A control in accordance with claim 6 and further including means for restraining rotation of said neutral adjustment member.

9. A control in accordance with claim 8 wherein said means for restraining rotation of said neutral adjustment member comprises a portion on said bracket and having therein an elongated slot which receives said neutral adjustment member for travel therein, and which includes elongated edges engageable by said neutral adjustment member to prevent rotation of said neutral adjustment member in common with rotation of said element.

10. A control in accordance with claim 9 and further including means for restraining movement of said neutral adjustment member along the path relative to said element.

11. A control in accordance with claim 8 wherein said means for restraining movement of said neutral adjustment member along the path comprises a nylon set screw extending in said neutral adjustment member and frictionally engaging said element.

12. A control in accordance with claim 8 wherein said means for restraining movement of said neutral adjustment member along the path comprises means for restraining rotation of said element relative to said bracket.

13. A control for a hydrostatic transmission having an operating member rotatable about a fixed pivot axis between a range of forward drive positions, a neutral position, and a range of reverse drive positions, said control comprising an actuating member adapted to be fixed to the operating member for common movement therewith about the pivot axis and having a portion adapted to be connected to an actuating link to effect pivotal movement of said actuating member about the pivot axis, a first return member mounted on said actuating member for pivotal movement about the pivot axis and independently of pivotal movement of said actuating member and including a part spaced from the pivot axis, a second return member mounted on said actuating member for pivotal movement about the pivot axis and independently of pivotal movement of said actuating member and of said first return member and including a part spaced from the pivot axis and located in facing relation to said part of said first return member, a pin fixed on said actuating member and extending between said parts of said first and second return members, means engaging said return members for biasing said return members toward each other and into engagement with said pin, a neutral adjustment member including a pin portion extending between said parts of said first and second return members and a hub portion including a threaded bore, an element threadedly engaged with said bore of said neutral adjustment member, a bracket including two spaced bracket portions which extend in parallel relation to each other and which respectively include therein apertures receiving said element for rotation about another fixed axis extending at a right angle from a radius from the pivot axis, and a third bracket portion having therein an elongated slot which receives said pin portion of said neutral adjustment member for travel therein, and which includes elongated edges engageable by said pin portion of said neutral adjustment member to prevent rotation of said neutral adjustment member, whereby rotation of said element causes movement of said neutral adjustment member along said axis of said element.

14. A control in accordance with claim 13 wherein said actuating member includes an arcuate slot which receives said pin portion of said neutral adjustment member, and which has opposite ends engageable with said pin portion of said neutral adjustment member to limit pivotal movement of said actuating member.

15. A control in accordance with claim 13 and further including means for restraining rotation of said neutral adjustment member relative to said element.

16. A control in accordance with claim 15 wherein said means for restraining rotation of said neutral adjustment member relative to said element comprises a nylon set screw extending in said neutral adjustment member and frictionally engaging said element.

17. A control in accordance with claim 15 wherein said means for restraining rotation of said neutral adjustment member relative to said element comprises means for restraining rotation of said element relative to said bracket.

* * * * *